United States Patent
Song

(10) Patent No.: US 12,333,097 B1
(45) Date of Patent: Jun. 17, 2025

(54) OPTICAL NAVIGATION DEVICE AND METHOD CAPABLE OF AVOIDING FALSE WAKE-UP FROM REST MODE

(71) Applicant: PixArt Imaging Inc., Hsin-Chu (TW)

(72) Inventor: Willie Song, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 18/743,082

(22) Filed: Jun. 13, 2024

(51) Int. Cl.
    *G06F 3/038* (2013.01)
    *G06F 3/03* (2006.01)
    *G06F 3/0354* (2013.01)

(52) U.S. Cl.
    CPC .......... *G06F 3/0383* (2013.01); *G06F 3/0304* (2013.01); *G06F 3/03543* (2013.01)

(58) Field of Classification Search
    CPC ... G06F 3/0383; G06F 3/0304; G06F 3/03543
    See application file for complete search history.

(56) References Cited

U.S. PATENT DOCUMENTS

| | | | |
|---|---|---|---|
| 8,199,110 B1* | 6/2012 | Wright | G06F 1/3259 250/221 |
| 2006/0125794 A1* | 6/2006 | Afriat | G06F 1/32 345/166 |
| 2014/0161320 A1* | 6/2014 | Kakarala | G06F 3/0317 382/103 |
| 2020/0326768 A1* | 10/2020 | Wahl | G06F 1/1694 |

* cited by examiner

*Primary Examiner* — Jonathan A Boyd
(74) *Attorney, Agent, or Firm* — Winston Hsu

(57) ABSTRACT

An optical navigation device includes an optical sensor and a microcontroller. The optical sensor generates at least one image frame to obtain displacement information and transmits the displacement information into the microcontroller for optical navigation in a run mode. The microcontroller receives the displacement information in the run mode and reports the displacement information to a host device to be externally coupled to optical navigation device through a specific communication interface based on a specific report rate. The optical sensor further respectively operates in different rest modes corresponding to different wake-up displacement amounts.

14 Claims, 2 Drawing Sheets

OPTICAL NAVIGATION DEVICE AND METHOD CAPABLE OF AVOIDING FALSE WAKE-UP FROM REST MODE

BACKGROUND OF THE INVENTION

1. Field of the Invention

The invention relates to an optical navigation mechanism, and more particularly to an optical navigation device and a corresponding method.

2. Description of the Prior Art

Generally speaking, a conventional optical mouse device may exit a rest mode and enter a run mode due to a false wake-up caused by noise. For instance, the conventional optical mouse device may erroneously and frequently wake up from the deepest rest state when the conventional optical mouse device is operating in a corner condition.

SUMMARY OF THE INVENTION

Therefore one of the objectives of the invention is to provide an optical navigation device and a corresponding method, to solve the above-mentioned problems.

According to the embodiments of the invention, an optical navigation device is disclosed. The optical navigation device comprises an optical sensor and a microcontroller. The optical sensor is capable of generating at least one image frame to obtain displacement information and used for transmitting the displacement information into a microcontroller for optical navigation in a run mode. The microcontroller is coupled to the optical sensor and used for receiving the displacement information in the run mode and reporting the displacement information to a host device to be externally coupled to optical navigation device through a specific communication interface based on a specific report rate. The optical sensor is further capable of respectively operating in different rest modes corresponding to different wake-up displacements amounts.

According to the embodiments of the invention, a method of an optical navigation device is disclosed. The method comprises: providing an optical sensor to generate at least one image frame to obtain displacement information and to transmit the displacement information into a microcontroller for optical navigation in a run mode; and using the microcontroller to receive the displacement information in the run mode and to report the displacement information to a host device to be externally coupled to optical navigation device through a specific communication interface based on a specific report rate. The optical sensor further respectively operates in different rest modes corresponding to different wake-up displacement amounts.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of optical navigation device and corresponding method capable of robustly avoiding false wake-up from the rest state/mode (or from the deepest rest state/mode). For example, the provided device and method can be used to prevent an optical sensor from waking up in the deepest rest state/mode through small report counts which may be caused due to a false wake-up behavior or due to noise generated in a navigation engine caused by the optical sensor operating in a corner condition (not limited to).

Figure 1:
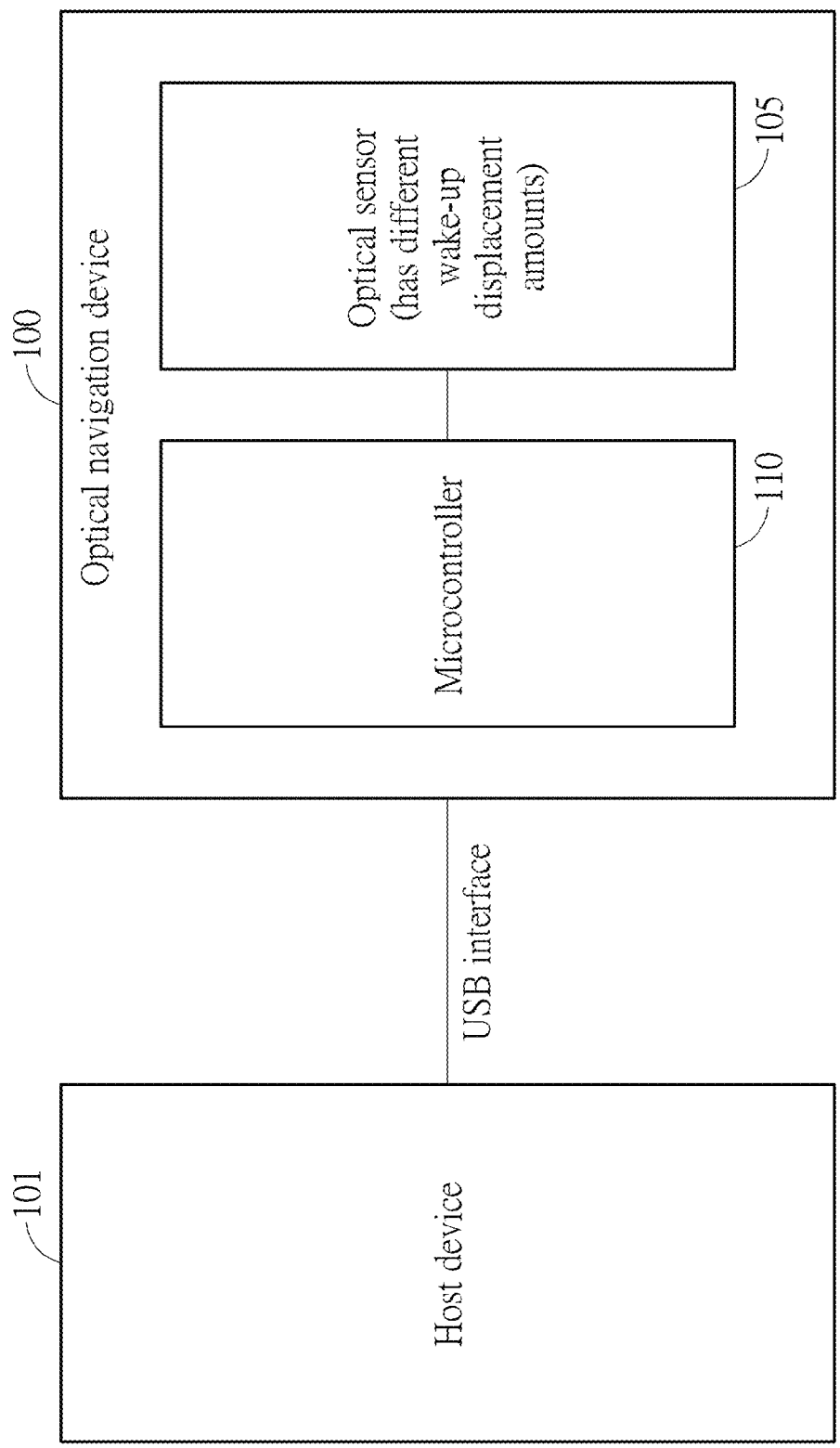
FIG. 1 is a diagram of an optical navigation device according to an embodiment of the invention.

FIG. 1 is a diagram of an optical navigation device 100 according to an embodiment of the invention. The optical navigation device 100 is for example an optical mouse device and comprises an optical sensor 105 and a microcontroller 110 coupled to the optical sensor 105. The optical mouse device 100 can be wireless/wired connected to the host device 101 (e.g. a personal computer device) through a specific communication interface such as wired USB (Universal Serial Bus) interface or wireless USB interface.

The optical navigation device 100 comprises a plurality of operation modes such as a run mode (i.e. a normal operating mode) and multiple different rest modes in which the optical navigation device 100 can save power if the optical navigation device 100 has been not controlled by a user/operator for corresponding time periods. The different rest modes are associated with different power requirements and different response times of the optical sensor 105 (or optical navigation device 100) for identical/different control behaviors of the user.

In the run mode, the optical sensor 105 is used for and capable of generating at least one image frame to obtain displacement information/amounts and used for transmitting the displacement information/amounts into the microcontroller 110 for optical navigation, and the microcontroller 110 is used for receiving the displacement information and reporting the displacement information to the host device 101 to be externally coupled to optical navigation device 100 through the specific communication interface based on a specific report rate. That is, in the run mode, the optical sensor 105 normally operates and generates the displacement information if the optical sensor 105 detects a motion.

In addition, the optical sensor 105 is further capable of respectively operating in the different rest modes, which are associated with different wake-up displacement amounts which can be also regarded as wake-up thresholds. For example, in a specific rest mode, the optical sensor 105 is used to detect whether a motion corresponding to a corresponding enough wake-up displacement amount occurs so as to determine whether to switch into the run mode. When detecting a motion having a displacement amount greater than a corresponding wake-up threshold, the optical sensor 105 may exit the specific rest mode and enter the run mode again. When merely detecting a motion having a displacement amount smaller than the corresponding wake-up threshold, the optical sensor 105 may keep and stay in the specific rest mode. It should be noted that, when staying in each rest mode, the optical sensor 105 does not transmit displacement information into the microcontroller 110 even if the optical sensor 105 may try to detect whether a motion occurs. In other words, the optical sensor 105 in each rest mode does not perform the optical navigation function/operation and only performs the wake-up check operation (i.e. trying to detect whether an enough motion occurs).

In one embodiment, the optical sensor 105 may have two rest modes. For example (but not limited), the optical sensor 105 is further capable of and used for operating in a first rest mode R1 with a lower power requirement and used for operating in a specific rest mode R3 (e.g. the deepest rest mode) with a lowest power requirement. In the first rest mode R1, the optical sensor 105 wakes up from the first rest mode R1 and enters the run mode when the displacement information (i.e. the detected displacement amount) is greater than a first wake-up threshold TH1. In the specific rest mode, the optical sensor 105 wakes up from the specific rest mode and directly enters the run mode only when the displacement information (i.e. the detected displacement amount) is greater than a specific wake-up threshold TH3 which is greater than the first wake-up threshold TH1. That is, in the specific rest mode, when the detected displacement amount is greater than the first wake-up threshold TH1 but is still smaller than the specific wake-up threshold TH3, the optical sensor 105 does not exit the specific rest mode and not enter the run mode.

In one embodiment, the optical sensor 105 may have three or more rest modes. For example (not limited to), in addition to the first rest mode R1 and the specific rest mode R3, the optical sensor 105 may be further capable of operating in a second rest mode R2 with another lower power requirement and a lower response time requirement. In the second rest mode R2, the optical sensor 105 wakes up from the second rest mode R2 and directly enters the run mode only when the displacement information (i.e. the detected displacement amount) is greater than a second wake-up threshold TH2, wherein the second wake-up threshold TH2 is smaller than the specific wake-up threshold TH3 and greater than the first wake-up threshold TH1.

In addition, in the run mode, the optical sensor 105 may switch from the run mode into the first rest mode R1 when the optical sensor 105 has detected no motions for a first downshift time such as one second (but not limited). In the first rest mode R1, the optical sensor 105 may switch from the first rest mode R1 into the second rest mode R2 when the optical sensor has detected no motions for a second downshift time such as ten seconds (but not limited). In the second rest mode R2, the optical sensor may switch from the second rest mode R2 into the specific rest mode R3 when the optical sensor 105 has detected no motions for a specific downshift time such as six hundred seconds (but not limited); the specific downshift time is significantly longer than the second downshift time which is longer than the first downshift time.

In a different implementation to achieve the same purpose of equivalently configuring a different wake-up threshold for the specific rest mode R3, the optical sensor 105 may buffer and accumulate the calculated displacement information (i.e. the calculated delta amounts) and performs addition internal processing to avoid reporting the displacement information to wake up the microcontroller 110. For example, a delta threshold may be further used, and the optical sensor 105 may be forced back to the specific rest mode R3 without reporting any displacement information if the calculated and accumulated displacement amount during a specific time period is less than the delta threshold. By doing so, this can keep the microcontroller 110 and/or the host device 101 in the specific rest mode R3 even though the three different rest modes R1, R2, and R3 are originally associated with the same wake-up threshold in a default setting.

Figure 2:
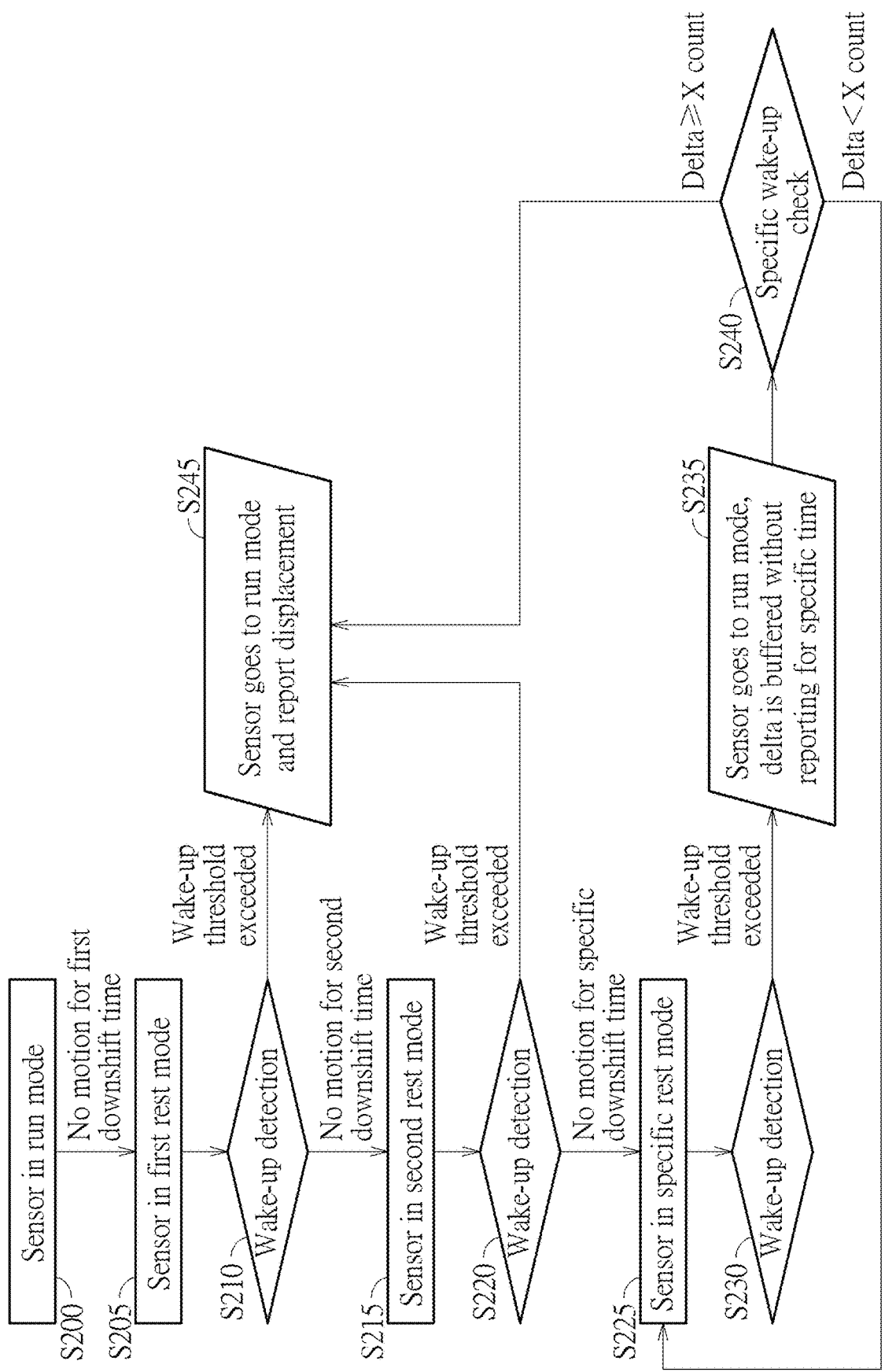
FIG. 2 is a flowchart diagram of an example of the operations of the optical navigation device according to one embodiment of the invention.

FIG. 2 is a flowchart diagram of an example of the operations of the optical navigation device 100 according to one embodiment of the invention. As shown in FIG. 2, for example (not limited to), in Step S200, initially the optical navigation device 100 (the optical sensor 105 and microcontroller 110) enters the run mode (i.e. the normal operation mode) to detect and report the displacement information to the host device 101 based on the specific report rate through the USB communication interface. Then, for example, the optical sensor 105 may detect that no motions occur during the first downshift time (e.g. one second), and the flow goes to Step S205. In Step S205, the optical sensor 105 enters the first rest mode R1.

In Step S210, the optical sensor 105 performs the wake-up detection operation. In the first rest mode R1, if the optical sensor 105 detect that no motions occur during the second downshift time (e.g. ten seconds), and the flow goes to Step S215. In Step S205, the optical sensor 105 enters the second rest mode R2. If the optical sensor 105 in the first rest mode R1 detects a motion having a displacement amount smaller than the first wake-up threshold TH1, then the optical sensor 105 determines that the detected motion is false and thus may stay in the first rest mode R1. Only when detecting a motion having a displacement amount greater than the first wake-up threshold TH1, the optical sensor 105 determines that such detected motion is a true motion and the flow goes to Step S245. In Step S245, the optical sensor 105 exits the first rest mode R1 and enters the run mode to detect motions and transmit the detected displacement amounts to the microcontroller 110 to make the microcontroller 110 report/transmit the displacement information back to the host device 101.

In the second rest mode R2, the optical sensor 105 performs another wake-up detection operation (Step S220). For example, in the second rest mode R2, if the optical sensor 105 detect that no motions occur during the third downshift time (e.g. 600 seconds), and the flow goes to Step S225. In Step S225, the optical sensor 105 enters the specific rest mode R3. If the optical sensor 105 in the second rest mode R2 detects a motion having a displacement amount smaller than the second wake-up threshold TH2, then the optical sensor 105 determines that the detected motion is false and thus may stay in the second rest mode R2. Only when detecting a motion having a displacement amount greater than the second wake-up threshold TH2, the optical sensor 105 determines that such detected motion is a true motion and the flow goes to Step S245. In another example, the second wake-up threshold TH2 may be identical to the first wake-up threshold TH1; that is, the optical sensor 105 uses the same wake-up threshold in the first and second rest modes R1 and R2.

In the specific rest mode R3, the optical sensor 105 performs another wake-up detection operation (Step S230). In this example, the optical sensor 105 may use the same wake-up threshold, which is identical to the wake-up threshold TH1 or wake-up threshold TH2, to determine whether a motion is true or false. Only when detecting a motion having a displacement amount greater than the same wake-up threshold, the flow goes to Step S235. In Step S235, the optical sensor 105 may temporarily enter an intermediate state/mode to determine whether to enter the run mode or switch back to the specific rest mode R3 if the optical sensor is in the specific rest mode and the displacement information (i. e. the detected displacement amount) is greater than the first wake-up threshold TH1 (or greater than the second wake-up threshold TH2). In the intermediate state, the optical sensor 105 buffers and calculates the accumulated displacement information/amount during the specific time period without transmitting the accumulated displacement information/amount into the microcontroller 110. Then, in Step S240, the optical sensor 105 performs a specific wake-up detection operation to determine whether the accumulated displacement information/amount (i.e. the accumulated delta amount during a specific time period Y) is greater than a specific threshold such as X counts (the number X is not limited). When the accumulated delta amount is smaller than the specific time period Y, the optical sensor 105 determines that the motion having the accumulated delta amount is a false motion and switches from the intermediate state into the specific rest mode R3. Only when the accumulated delta amount is greater than or equal to the specific time period Y, the optical sensor 105 determines that the motion having the accumulated delta amount is a true motion and switches from the intermediate state into the run mode; thus, in this situation, the flow goes to Step S245.

In the embodiments, the optical navigation device 100 (or optical sensor 105) is able to further configure a different wake-up threshold to separate different rest modes, so that the optical navigation device 100 in the deepest rest mode will not easily affected by noise and more power can be saved in the deepest rest mode such as the specific rest mode R3. In addition, the optical navigation device 100 (or optical sensor 105) is able to buffer and accumulate the calculated displacement amount for/during a specific time period so as to check whether a big movement/motion occurs or not before the optical sensor 105 is totally back to the run mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation device, comprising:
an optical sensor, for generating at least one image frame to obtain displacement information and used for transmitting the displacement information into a microcontroller for optical navigation in a run mode; and
the microcontroller, coupled to the optical sensor, for receiving the displacement information in the run mode and reporting the displacement information to a host device to be externally coupled to optical navigation device through a specific communication interface based on a specific report rate;
wherein the optical sensor further respectively operates in different rest modes corresponding to different wake-up displacement amounts and respectively wakes up from the different rest modes to enter the run mode when detecting the different wake-up displacement amounts respectively in the different rest modes.

2. The optical navigation device of claim 1, wherein the optical sensor is further capable of operating in a first rest mode with a lower power requirement and in a specific rest mode with a lowest power requirement; the optical sensor wakes up from the first rest mode and enters the run mode when the displacement information is greater than a first wake-up threshold; and, the optical sensor wakes up from the specific rest mode and enters the run mode when the displacement information is greater than a specific wake-up threshold which is greater than the first wake-up threshold.

3. The optical navigation device of claim 2, wherein the optical sensor is further capable of operating in a second rest mode with another lower power requirement and a lower response time requirement; the optical sensor wakes up from the second rest mode and enters the run mode when the displacement information is greater than a second wake-up threshold; and, the second wake-up threshold is smaller than the specific wake-up threshold and greater than the first wake-up threshold.

4. The optical navigation device of claim 3, wherein the optical sensor switches from the run mode into the first rest mode when the optical sensor detects no motions for a first downshift time; the optical sensor switches from the first rest mode into the second rest mode when the optical sensor detects no motions for a second downshift time; the optical sensor switches from the second rest mode into the specific rest mode when the optical sensor detects no motions for a specific downshift time; and, the specific downshift time is longer than the second downshift time which is longer than the first downshift time.

5. The optical navigation device of claim 1, wherein the optical sensor is further capable of operating in a first rest mode with a lower power requirement and in a specific rest mode with a lowest power requirement; the optical sensor wakes up from the first rest mode and enters the run mode when the displacement information is greater than a first wake-up threshold; and, when the optical sensor is in the specific rest mode and the displacement information is greater than the first wake-up threshold, the optical sensor wakes up from the specific rest mode and temporarily enters an intermediate state to calculate accumulated displacement information during a specific time period without transmitting the accumulated displacement information into the microcontroller.

6. The optical navigation device of claim 5, wherein the optical sensor switches from the intermediate state into the run mode when the accumulated displacement information is greater than a specific threshold; and, the optical sensor switches from the intermediate state into the specific rest mode when the accumulated displacement information is smaller than the specific threshold.

7. The optical navigation device of claim 1, wherein the optical sensor in the different rest modes is arranged to detect whether motions corresponding to different displacement amounts occur to determine whether to switch into the run mode without transmitting the different displacement amounts into the microcontroller.

8. A method of an optical navigation device, comprising:
providing an optical sensor to generate at least one image frame to obtain displacement information and to transmit the displacement information into a microcontroller for optical navigation in a run mode; and
using the microcontroller to receive the displacement information in the run mode and to report the displacement information to a host device to be externally coupled to optical navigation device through a specific communication interface based on a specific report rate;
wherein the optical sensor further respectively operates in different rest modes corresponding to different wake-up displacement amounts and respectively wakes up from the different rest modes to enter the run mode when detecting the different wake-up displacement amounts respectively in the different rest modes.

9. The method of claim 8, further comprising:
operating the optical sensor in a first rest mode with a lower power requirement and in a specific rest mode with a lowest power requirement;
controlling the optical sensor to wake up from the first rest mode and enter the run mode when the displacement information is greater than a first wake-up threshold; and controlling the optical sensor to wake up from the specific rest mode and enter the run mode when the displacement information is greater than a specific wake-up threshold which is greater than the first wake-up threshold.

10. The method of claim 9, further comprising:

operating the optical sensor in a second rest mode with another lower power requirement and a lower response time requirement; and controlling the optical sensor to wake up from the second rest mode and enters the run mode when the displacement information is greater than a second wake-up threshold;

wherein the second wake-up threshold is smaller than the specific wake-up threshold and greater than the first wake-up threshold.

11. The method of claim 10, further comprising:

controlling the optical sensor to switch from the run mode into the first rest mode when the optical sensor detects no motions for a first downshift time;

controlling the optical sensor to switch from the first rest mode into the second rest mode when the optical sensor detects no motions for a second downshift time; and controlling the optical sensor to switch from the second rest mode into the specific rest mode when the optical sensor detects no motions for a specific downshift time;

wherein the specific downshift time is longer than the second downshift time which is longer than the first downshift time.

12. The method of claim 8, further comprising:

operating the optical sensor in a first rest mode with a lower power requirement and in a specific rest mode with a lowest power requirement;

controlling the optical sensor to wake up from the first rest mode and enter the run mode when the displacement information is greater than a first wake-up threshold; and when the optical sensor is in the specific rest mode and the displacement information is greater than the first wake-up threshold, controlling the optical sensor to wake up from the specific rest mode and temporarily enter an intermediate state to calculate accumulated displacement information during a specific time period without transmitting the accumulated displacement information into the microcontroller.

13. The method of claim 12, further comprising:

controlling the optical sensor to switch from the intermediate state into the run mode when the accumulated displacement information is greater than a specific threshold; and controlling the optical sensor to switch from the intermediate state into the specific rest mode when the accumulated displacement information is smaller than the specific threshold.

14. The method of claim 8, wherein the optical sensor in the different rest modes is arranged to detect whether motions corresponding to different displacement amounts occur to determine whether to switch into the run mode without transmitting the different displacement amounts into the microcontroller.

* * * * *